United States Patent [19]

Penn

[11] Patent Number: 4,642,529
[45] Date of Patent: Feb. 10, 1987

[54] APPARATUS AND METHOD FOR MEASURING LINEWIDTH AND CONVERGENCE IN A COLOR CATHODE RAY TUBE DISPLAY SYSTEM

[75] Inventor: Cecil W. Penn, Phoenix, Ariz.

[73] Assignee: Sperry Corporation, New York, N.Y.

[21] Appl. No.: 713,127

[22] Filed: Mar. 18, 1985

[51] Int. Cl.⁴ .................. H01J 29/70; H04N 17/02; H04N 9/24
[52] U.S. Cl. .................................. 315/368; 358/10; 358/69; 315/10
[58] Field of Search ................. 315/368, 10, 370, 371; 313/412, 428, 430, 437; 358/10, 67–69

[56] References Cited

U.S. PATENT DOCUMENTS

| | | | |
|---|---|---|---|
| 4,137,548 | 1/1979 | Kelly et al. | 358/10 |
| 4,291,256 | 9/1981 | Garwin | 315/368 |
| 4,439,735 | 3/1984 | Alvite et al. | 358/10 |

*Primary Examiner*—Theodore M. Blum
*Assistant Examiner*—Gregory C. Issing
*Attorney, Agent, or Firm*—Howard P. Terry; Arnold L. Albin

[57] ABSTRACT

Apparatus for providing precise convergence measurements of electron beams in a CRT display by sensing the displacement of brightness peaks as an array of phosphorescent regions are sequentially illuminated by energy from the electron beams deflected by the deflection apparatus of the display system and an independent external time varying magnetic field applied by enclosing the CRT housing within a pair of external coils. Convergence is calculated by calibrating the recorded brightness peaks as a function of beam displacement. The system is adaptable to measuring both vertical and horizontal components of convergence as well as linewidth. The apparatus operates independently of and does not require interruption of dynamic functions which operate in synchronism with the deflection circuits, such as dynamic convergence correction.

12 Claims, 10 Drawing Figures

APPARATUS AND METHOD FOR MEASURING LINEWIDTH AND CONVERGENCE IN A COLOR CATHODE RAY TUBE DISPLAY SYSTEM

BACKGROUND OF THE INVENTION

1. Field of the Invention

The present invention relates generally to convergence measurements in color cathode ray tube (CRT) display assemblies of the type using a multiplicity of electron beams for illuminating a phosphorescent screen, and more particularly to display assemblies of the well known shadow mask type.

2. Description of the Prior Art

It is well known to those skilled in the color CRT art that separate beams of energy are generated, usually from three separate guns, which beams are normally focused on a screen or mask spaced from the interior surface of the CRT viewing surface. For example, in a shadow mask structure the screen is comprised of a multiplicity of minute openings through which the beam triad passes and then diverges to energize corresponding dot triads of red, green and blue phosphors, resulting in red, green, and blue light emissions from the face of the CRT. Other phosphor configurations, such as oblong regions or even parallel stripes may also be employed. The problem of misconvergence arises when the separate beams of energy from the red, green and blue color guns do not impinge at the same point of the viewing surface. It will be appreciated that manufacturing tolerances in the guns, mounts, tube neck, and mask and faceplate geometry, as well as inherent nonuniformity or nonlinearity of the magnetic fields generated by the beam deflection coils will tend to deflect a particular color beam from its intended path. In order to assure convergence over the entire viewing surface, each of the several beams of energy must intersect precisely at a predetermined hole of the mask. The term convergence is defined as making each of the several beams of energy all coincide at the same point as that point progresses in the scan across the viewing surface.

Related to convergence is the concept of linewidth. As a phosphorescent array is sequentially scanned across a transverse axis on the face of the viewing screen, the apparent brightness of the line in a direction orthogonal to the scanned axis varies, being most intense at the center of the phosphorescent region. Linewidth may be conveniently defined as the distance across the phosphorescent region, such as a dot, at which the brightness is observed to diminish to 50% of its peak intensity.

In practice, it has not been possible to obtain perfect convergence, such as is required for flight instrument display systems, which are viewed at close range, purely by mechanical means or deflection coil design. In consequence, a multiplicity of schemes has been developed for applying an electronic compensation, such as is described in U.S. Pat. No. 4,385,259, issued May 24, 1983, to Carl L. Chase, et al and assigned to the assignee of the present invention. In that scheme, analog coarse information, which is a function of the longitudinal and vertical positions of the beams, and fine compensation, provided by digital programable-read-only-memories, were summed together and applied to the convergence correction coils of the CRT.

In applying convergence correction schemes, such as that referenced above, it is necessary to perform a calibration wherein the linewidth can be measured and the degree of misconvergence determined so that the display may be optimized and convergence errors minimized. One current technique for measuring linewidth, for example, is to provide a stationary light sensor responsive to a display line which is scanned on the face of the screen. The sensing area of the light sensor is made extremely minute, much smaller than the displayed linewidth, and therefore may be centered on a phosphor area of the desired color. The scan is accomplished by applying a repetitive voltage waveform to one axis of the deflection yoke. The voltage across the yoke is applied together with an output from the light sensor and plotted on an x-y recorder. The x-axis, for example, may be calibrated to correlate with the scanned distance of the displayed line and the detected light intensity applied to the y axis. The linewidth then can be calculated by conventional techniques (i.e. as by defining the linewidth to be the width at the one-half peak brightness points).

Convergence may be measured by moving a light sensor a known distance to another phosphor area and plotting a second linewidth of another color. The difference between peaks of the plotted responses is a measure of the degree of misconvergence. If the beams are not exactly aligned on the mask apertures, the difference between peaks will not correspond to the distance the light sensor has been moved. Perfect convergence occurs when the peaks of the three color beams are superimposed or displaced a distance corresponding to the mask aperture spacing, depending on the orientation of the mask with respect to the light sensor.

Another approach for adjusting a convergence apparatus is described in U.S. Pat. No. 4,291,256, issued to R. L. Garvin on Sept. 22, 1981, wherein a photodiode detector is focused on a single spot on the display face and the display unit is equipped to independently disable, position and intensify each beam. However, this system does not provide for quantitative measurements of convergence.

The above techniques work where the associated electronic convergence correction apparatus can be disabled. However, when convergence measurements must be made on a display instrument which has complex dynamic electronic controls for convergence which must remain in synchronism with the deflection commands, auxiliary interface circuitry must be developed to assure no interaction between the dynamic correction functions and the test circuitry. Moreover, these techniques require that the instrument be opened up and the yoke leads disconnected and brought out to the test and control apparatus. By interfacing the electronics inside the instrument to the external circuitry of the test apparatus, there is always some risk of operating the CRT in an abnormal manner and hence invalidating any measurements. For example, the increased lead length may result in noise and jitter on the sweep signal. Further, the interfacing electronics must be adapted or reconstructed to conform to each type of display unit to be tested and therefore is not readily interchangeable between different models of display units.

SUMMARY OF THE INVENTION

The present invention provides a precision convergence measurement apparatus for use with a CRT display system. While primarily intended for shadow mask color CRT tube displays, it may be used with any type of CRT display, including monochrome and penetron tubes. The apparatus is applied externally to the display system which therefore may operate normally while the measurement is performed. No access to the interior of the display is required and no problems with the synchronism of the dynamic conversion functions are present. The measurements obtained in this manner will be indicative of the misconvergence of the display under normal operating conditions.

Basically the apparatus provides an external set of solenoidal magnetic deflection coils, which are excited independently of the beam deflection signals so as to permit deflection of the electron beams in accordance with a signal applied to the external coils, while the beam is caused to scan sequentially in its normal direction by the internal deflection apparatus. The external deflection coils are excited by a function generator which provides a cyclical control signal. A photoresponsive detector is focused upon a selected color region to sense luminescent radiation and is mounted on a carriage which permits precise displacement across the width of the region and precise focusing on adjacent colored regions. The output of the photosensor and the function generator are coupled to a display device, such as an x-y plotter, to provide an output signal indicative of the relative brightness of the selected color region as a function of beam deflection. By comparing the deflection between brightness maxima for the colored regions with the optically-determined distance therebetween, the degree of misconvergence may be computed. Linewidth may be directly determined from the same relative brightness display, in a manner described below.

A method for measuring convergence in a color cathode ray tube display system using the above apparatus comprises energizing the system to provide a display pattern having essentially horizontal lines across the viewing face, and thereupon superimposing an independent magnetic deflection field upon the system. The magnetic deflection field displaces the display pattern, and is arranged to displace the pattern vertically, both positively and negatively, with respect to the horizontal lines. The lines are observed through a photoresponsive detector and microscope, thereby providing a signal to a recorder which is synchronized with the magnetic deflection field to provide an output representative of the observed spot brightness correlated with electron beam displacement.

DESCRIPTION OF THE PREFERRED EMBODIMENTS

Before discussing the apparatus for carrying out the present invention, a discussion of the geometric basis thereof will be presented to aid in understanding of the invention.

Figure 1:
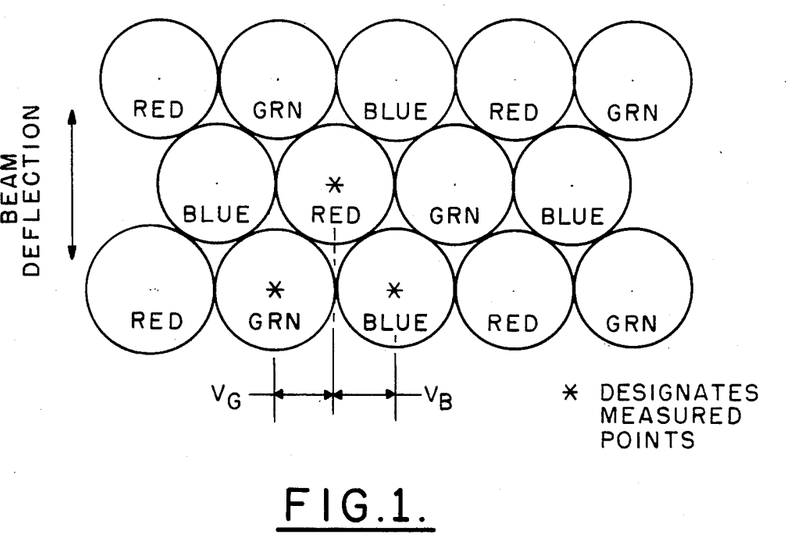
FIGS. 1 and 2 show alternate orientations of a typical shadow mask screen of a color cathode ray tube for convergence measurements.

For clarity of presentation, the examples will address a representative orientation of the tri-color phosphor dots on a typical shadow mask color CRT as shown in FIG. 1. However, it will be understood that the illustration is exemplary and not limiting, and that other phosphor configurations such as non-circular "dots", or parallel stripes fo phosphorescent material arranged in a sequential array of alternating colors, are also useful in practicing the invention.

It may be seen from FIG. 1 that the representative primary colors red, green, and blue are arranged in sequential order, with a phosphor dot of any one color surrounded alternately and sequentially by phosphor dots of the other two colors. When excited by the corresponding electron beams, the color dots are caused to phosphoresce under control of the beam deflection system.

Ideally, pure colors will be assured when the blue, red, and green beams, which converge at a point on the viewing surface, are directed to impinge only on their corresponding color phosphor dots. When the separate electron beams do not impinge at ther same location on the viewing surface, spurious colors, such as color fringes on a white line, or separate colored lines, will be observed. The degree to which the separate electron beams are misplaced relative to each other is called misconvergence.

Figure 3A:
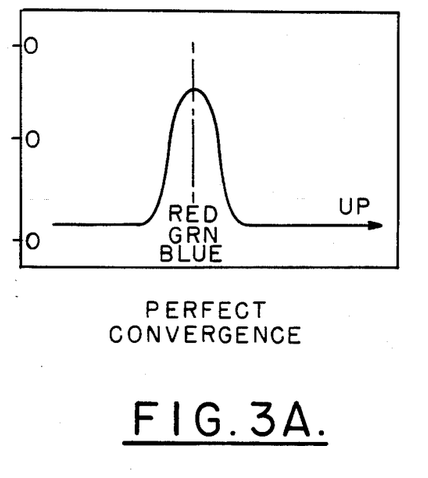
FIGS. 3A–3D show typical convergence recordings for conditions of perfect convergence and misconvergence of vertical and horizontal scanning lines.
Figure 3B:
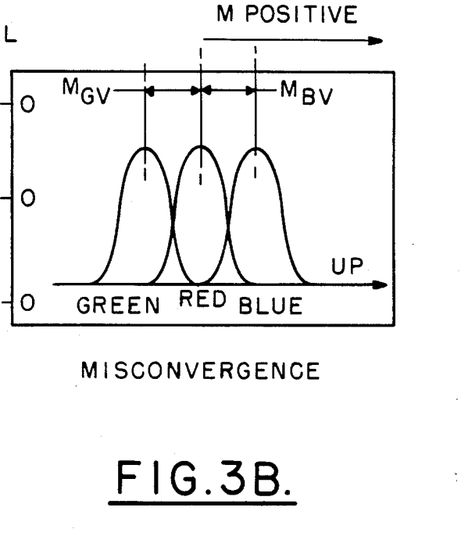

If the red, blue, and green dots 10, 12, 14 are excited by a horizontal stroke vector, and no other phosphor dots are excitted, a white line will result from the superposition of the primary colors. Perfect convergence occurs when the brightness peaks of the phosphor dots are in alignment with respect to a vertical axis. Thus, vertical misconvergence can be measured by the determining the peak brightness scanning in a vertical direction of selected color phosphor dots arranged along a horizontal axis. This is shown in FIG. 3A, in which relative brightness is plotted along the vertical coordinate against vertical displacement plotted along the horizontal coordinate. If the brightness amplitudes of a red, green, and blue dot are superimposed upon a common display, it may be seen that they will be superimposed for the condition of perfect convergence. However, as shown in FIG. 3B, should a beam be vertically displaced, either up or down from a center phosphor position, there will be a shift in the corresponding peak brightness position along the horizontal axis of the recording. Thus, FIGS. 3B shows a misconvergence as having the value $M_{GV}$ representing the vertical misconvergence of the green and red electron beams, and $M_{BV}$, representing the vertical misconvergence of the red and blue electron beams.

Figure 3C:
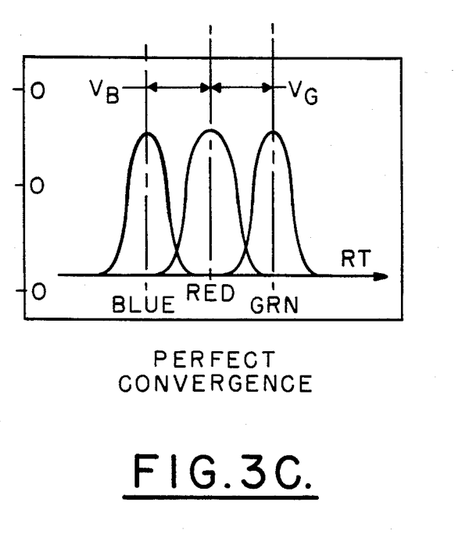
Figure 3D:
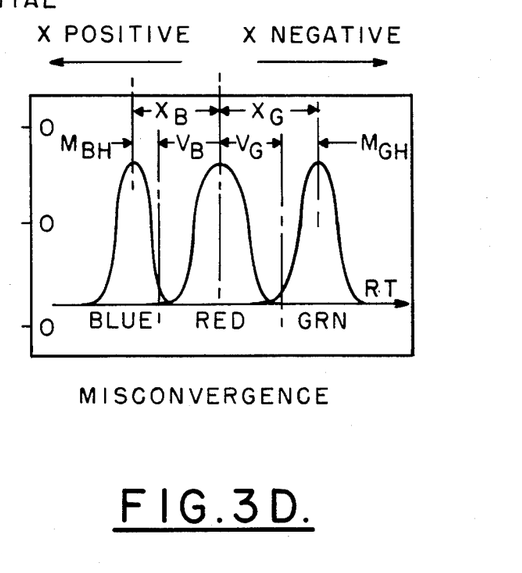

For the measurement of misconvergence, the measurement must be performed by observing the brightness peaks along the stroke axis of the electron beams as the sweep is simultaneously deflected along an orthogonal axis. Thus, when measuring vertical misconvergence, the stroke vector passes through the center points of phosphor dots 10, 12, 14 in succession, while the beam is deflected vertically in a periodic manner along the line denoted "beam deflection". However, for a measurement of the horizontal component of misconvergence in which the stroke vector is vertically scanned, the brightness peaks should be separated horizontally by a distance corresponding to the horizontal component of spacing between centers of adjacent color dots since the dot centers are no longer aligned along the swept axis. As shown in FIG. 3C, a green-red distance is denoted $V_G$ and a red-blue distance denoted $V_B$. The horizontal components of misconvergence, shown as $M_{BH}$ and $M_{GH}$ on FIG. 3D, are obtained by taking the measured differences of the observed brightness peaks of the blue and green dots with respect to the red, for example, shown as $X_B$ and $X_G$, respectively, with the optically measured horizontal displacement of the color dots on the viewing surface between centers, $V_B$ and $V_G$. However, since the electron beams must stroke vertically while simultaneously being deflected horizontally in order to measure horizontal misconvergence, it may be seen from FIG. 1 that for a beam centered on a red dot, for example, the observing instrument must be offset horizontally in order to sense the peak of the green and blue dots. This distance may be measured optically with a calibrated microscope to obtain the values $V_G$ and $V_B$. By displacing the sensing instrument correspondingly, as each dot is individually scanned, one may again obtain a recording of brightness patterns for each of the adjacent phosphor color dots.

Figure 2:
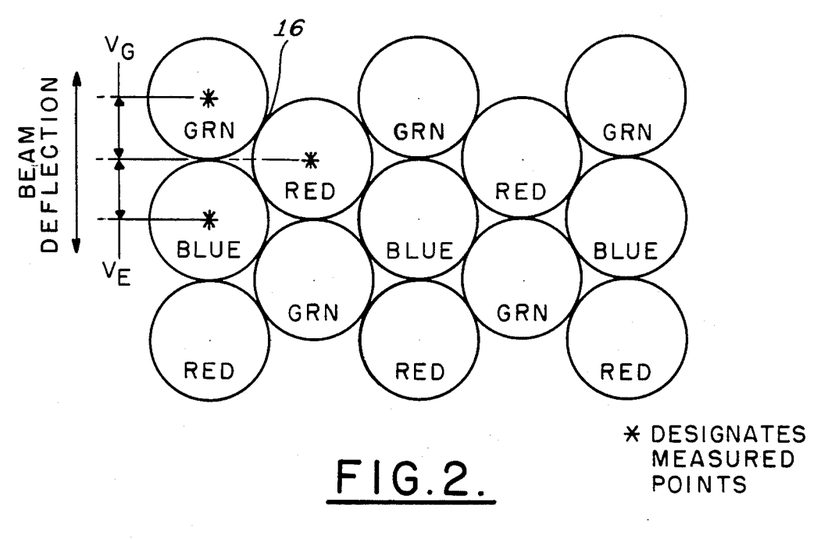

Ideally, the observed brightness peaks will be separated by the measured geometric distances $V_B$ and $V_G$, as shown in FIG. 3C. However, in the absence of perfect convergence, the brightness peaks will be displaced by a distance $M_{BH}$ for the blue and $M_{GH}$ for the green, as shown in FIG. 3D. For convenience, actual measurements of horizontal misconvergence are preferably made with the viewing screen rotated 90°, as will be described below. The dot pattern then appears as shown in FIG. 2, where the vertical stroke represents the cyclical beam deflection across the phosphor dot, while the horizontal axis represents dot displacement.

Figure 4:
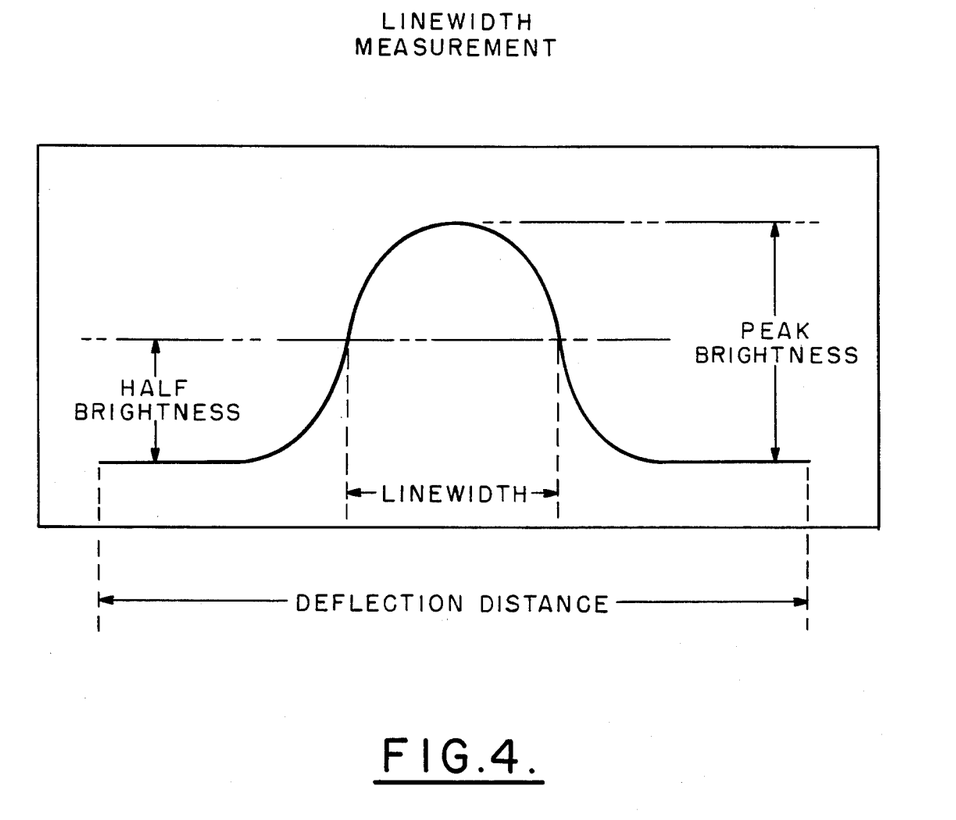
FIG. 4 is a curve defining the linewidth measurement geometry.

While color convergence is not of concern in a monochromatic display, linewidth can be determined from the preceeding data. Of course, linewidth is also of interest in color displays. As shown in FIG. 4, linewidth may be determined from the convergence brightness characteristic curves. Thus, linewidth in FIG. 4 can be read directly from the graph. One finds the one-half brightness points and by calibrating the width of the graph can obtain a measure of linewidth in absolute terms (i.e. mils).

Figure 5:
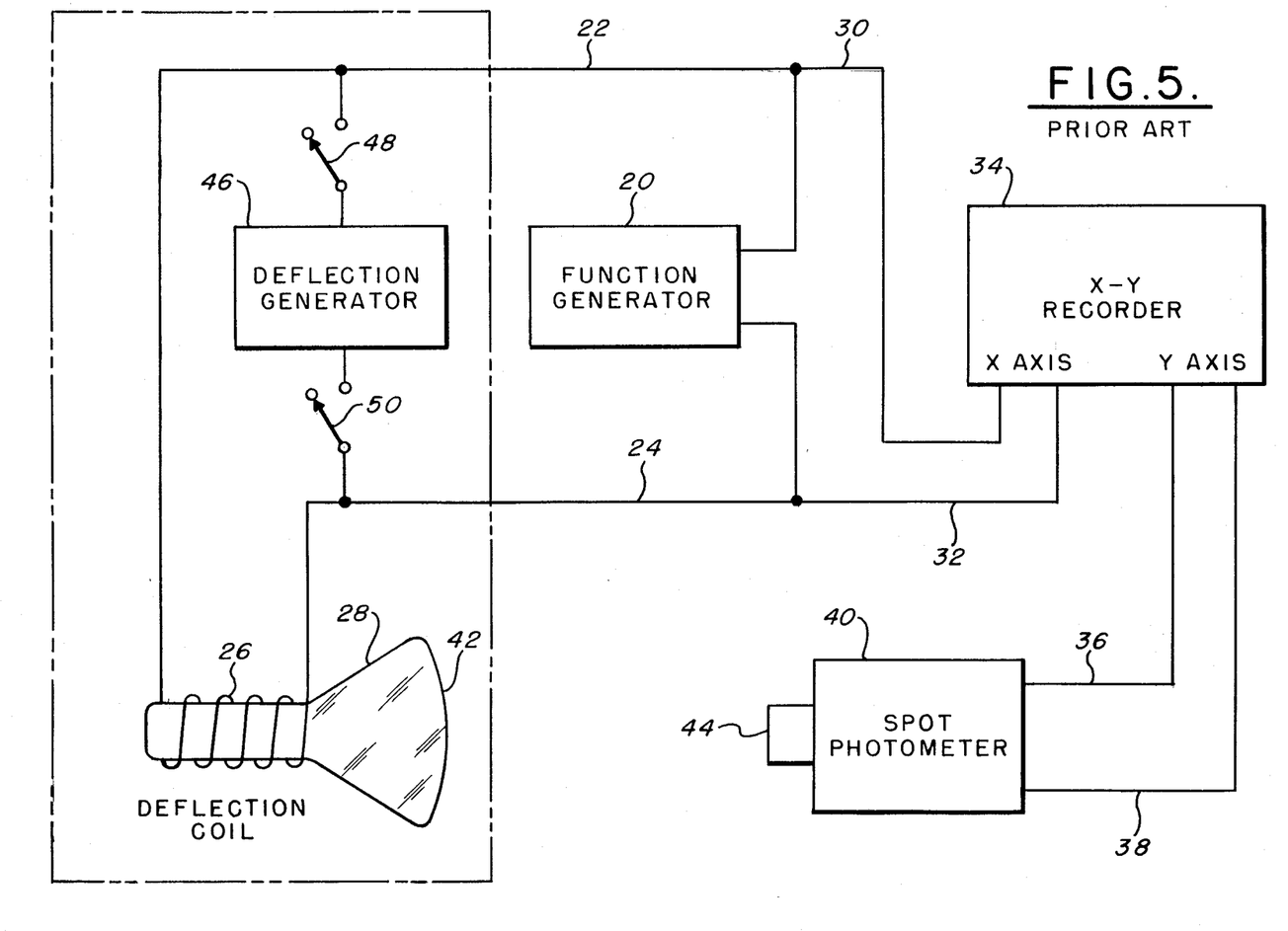
FIG. 5. is a functional block diagram of a convergence measuring apparatus of the prior art.

Referring now to FIG. 5, a schematic block diagram of a prior art convergence measurement system is shown. A function generator 20 is coupled via leads 22 and 24 to one axis of a deflection coil 26 coupled to a CRT 28. The voltage output of function generator 20 is also applied via leads 30 and 32 to, for example, the x axis of an x-y recorder 34. The y axis of recorder 34 is in turn coupled by means of leads 36 and 38 to a spot photometer 40 which is arranged to focus on the face of the CRT. The deflection generator 46 is diabled and function generator 20 applies a voltage waveform to deflection coil 26 to scan an electron beam across a desired coordinate axis. The voltage across the deflection coil is simultaneously applied to the x axis of the recorder 34. The photometer 40 is focused on a phosphor dot of the desired color on the viewing screen 42 of CRT 28. The sensing area of the light sensor 44 is selected to be appreciably smaller than the displayed linewidth. The output of the light sensor 40 corresponding to the phosphor dot intensity is plotted on the vertical y axis of recorder 34 as a function of beam displacement. The horizontal x axis of the resultant plot may be calibrated in terms of the scanned distance, as by using a micrometer microscope stage for mounting the photosensor 40, and the linewidth can be calculated by the techniques described above by scanning the displayed line passed the stationary light sensor.

Convergence can be measured by moving the light sensor a known distance to another phosphor dot and plotting the linewidth for another color. By taking the difference between the known distance the light sensor is moved and the observed distance between the two brightness peaks on the chart, as described above, the convergence may be calculated.

While the foregoing technique works well for measuring the linewidths and convergence of a CRT and yoke assembly alone, it is not readily adaptable to measurements on a complete display instrument. Such measurements require that the instrument housing be opened and the yoke leads disconnected for connection to the function generator. Thus, the internal deflection generator 46 which may include dynamic functions which must operate in synchronism with the deflection, such as dynamic focus or dynamic convergence functions, must be disconnected by switches 48 and 50 or special interfacing circuitry (not shown) may have to be built to assure that the dynamic functions remain in synchronism with the deflection. Further, by interfacing to the electronics inside the instrument, there is always a risk of operating the CRT in an abnormal manner thus resulting in eroneous convergence measurements. Moreover, for each type of display unit to be tested a new electronics interface would have to be constructed. Thus, an excessive amount of engineering time and cost is required for what should be essentially a routine test function.

Figure 6:
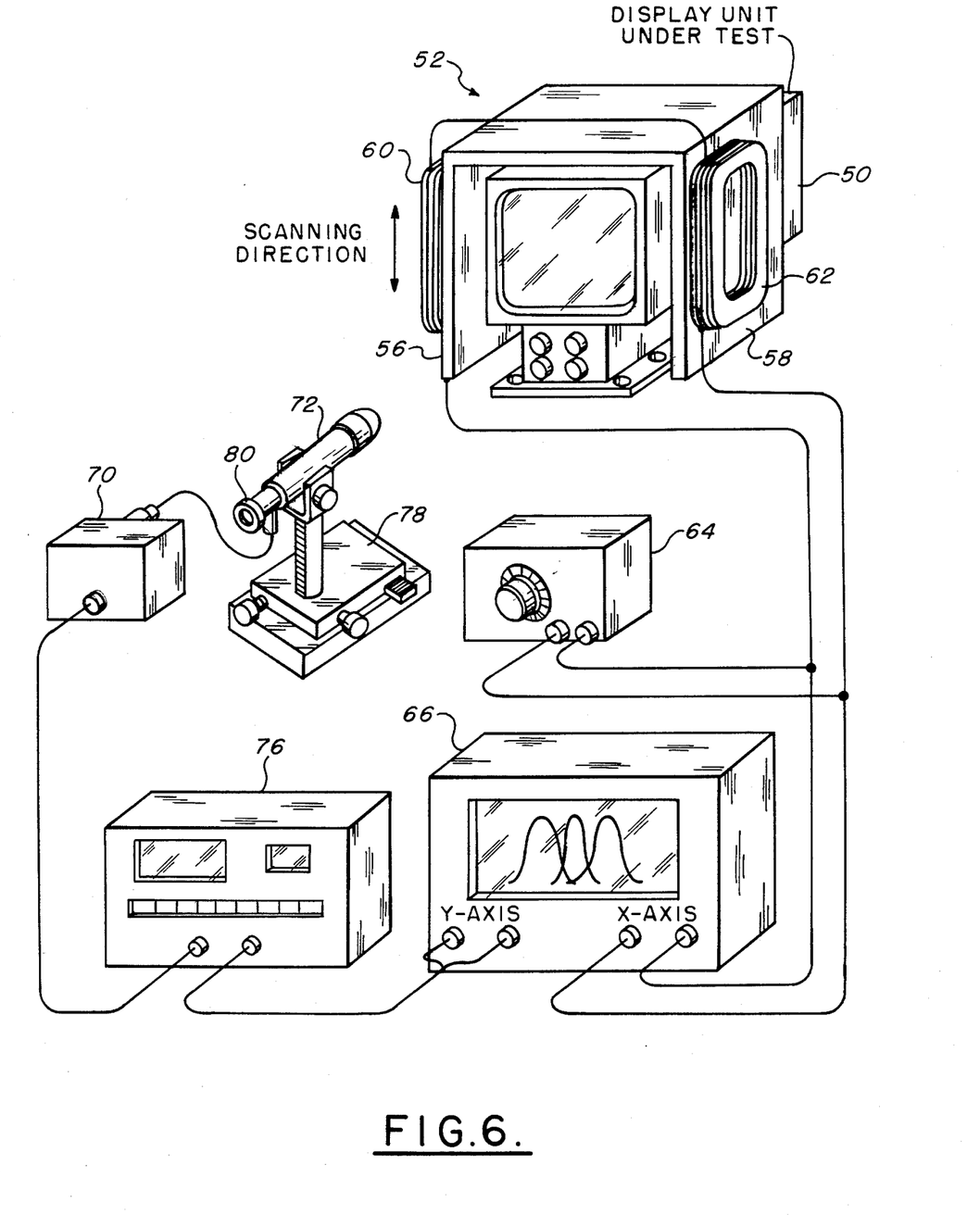
FIG. 6 is a schematic block diagram showing the convergence measuring apparatus of the present invention.

The improved convergence measuring apparatus of the present invention is shown schematically in FIG. 6. A display unit 50 is partially enclosed within a U-shaped housing 52. The base 54 of housing 52 rests upon display unit 50. A pair of substantially parallel end plates 56, 58 extend from the base of the housing and have mounted thereon respective coils 60 and 62 for inducing a magnetic deflection of the cathode ray tube beams in a manner to be described. The coils preferably have a relatively large lateral dimension with respect to their cross sectional area and may be comprised, for example, of 300 turns of number 22 gauge magnetic wire on each side of the housing. In one embodiment, the coils were formed in a rectangular shape with sides approximately 10 inches × 10 inches long in a depth of approximately ¾ inch. This structure was successfully used on CRTs having a 14 inch length and a 5 inch by 5 inch tube face, mounted in a 6 inch by 6 inch case. The described coil size and windings are also applicable to smaller CRTs. For larger CRTs the number of windings increases approximately linearly with the coil size; i.e., if the coil diameter is doubled, the number of turns of the windings should also be doubled. The geometric axis extending through the centers of the coils defines a magnetic axis which should be placed parallel to the screen with the sensed axis of the phosphor screen coincident with the axis of the coils. Other structures are also suitable, the aforementioned construction being merely descriptive and not limiting. For example, it will be shown that it will be necessary to rotate the display unit under test by 90° to obtain both vertical and horizontal component of misconvergence. This procedure may be avoided by provided a second set of parallel coils with one coil mounted on the base 54 and another coil parallel thereto upon a further plate fixed to ends 56 and 58. The opposing coil pairs may thereupon be switched as desired to induce a magnetic deflection of the CRT beams in orthogonal directions. Further, when large CRT units are being tested, it may be desirable to provide magnetic inductance coils as large as one meter in diameter, suitably spaced, so as to provide a more uniform field for the test apparatus.

A function generator 64 energizes the deflection coils 60 and 62. Preferably, the waveform provided will be of a triangular type sufficient to cause a 50 to 100 mil deflection of the display pattern at a frequency of about 0.2 Hz. However, other cyclical waveforms, such as sawtooth or sinewave, are also suitable. It may be seen that the desired stroke scanning of the display lines may be allowed to occur under the control of the display unit, while a varying magnetic field which applies an orthogonal deflection is imposed by the external set of coils mounted on the display unit. Thus, no access to the interior of the display is required and no problems associated with maintaining synchronism of dynamic functions will be present. Consequently, the measurement obtained in this manner will be indicative of the convergence under normal operating conditions. Moreover, the invention is readily adapted to a multiplicity of displays and the structure is not perculiar to any one particular display. Thus, any CRT of suitable size, including monochrome, penetron, and shadow-mask types, may be placed between the coils for measurement without modification of the apparatus.

The function generator output is also coupled to an x-y recorder or storage oscilloscope 66, or other similar display device capable of providing a fixed record of the waveform applied. As shown in FIG. 6, a portion of the function generator output is applied to the x-axis of the display 66 which may be calibrated in a method to be described to permit direct reading of linewidth and convergence. A suitable recorder is the Omnigraphic Model 2000 Chart Recorder. A suitable function generator is the Wavetek Model 166 50 MHz Pulse/Function Generator, available from Wavetech, Inc., P.O. Box 651, San Diego, CA 92123. Other conventional instruments may also be used.

A photo-responsive sensor is also provided for sensing radiation from the luminescent phosphorescent dots on the screen. This sensor may be comprised of a photo-multiplier assembly 70, a microscope 72 for focusing upon the desired dot, a fiber optic probe 74, and a digital radiometer 76. Suitable components may be assembled from the Gama Scientific Model C-3 System, available from EG&G Gamma Scientific, Inc., 3777 Ruffin Rd., San Diego, CA 92123.

The microscope 72 is mounted on a stand 78, shown in the Figure as rack and pinion apparatus. This permits moving the photometer sensor horizontally and vertically as well as focusing by moving the microscope towards and away from the screen. Worm gears would also be suitable. Microscope 72 may be set for a numerical aperature of about 0.25 which will provide a sensing area on the phosphor screen of 0.0008 inches in diameter, using a 50-micron eye piece. This small sensing area allows one to measure the brightness inside a single phosphor dot (a typical dot diameter is about 0.005 inches). An eyepiece 80 is coupled to the fiber-optic probe 74 and provides an optical signal to photomultiplier 70. The output of photomultiplier 70 is coupled to radiometer 76 which amplifies the input signal to an amplitude suitable for driving the y axis of recorder 66. Thus, the y axis provides an output proportional to the brightness of the observed phosphor dot, and the x axis indicates displacement of the electron beam.

In operation, the display unit is energized and a stroke pattern established preferably with horizontal and vertical lines. For measuring the vertical component of convergence a horizontal scan line will be utilized. A function generator is then caused to generate a triangle wave as described above. The external coils are located with their axis approximately coplanar with the phosphor screen of the CRT. When the function generator energizes the coils, a magnetic field is induced parallel to the axis of the two coils. The strength of the field can be varied by adjusting the magnitude of the current through the coils and in practice will range up to several gauss. The electron beams traveling from the CRT neck to the viewing surface are influenced by the field produced by the external coils, the direction of force on the electron beam produced thereby being orthogonal to both the magnetic field and the velocity vector of the electrons. The result is that the beams are caused to scan vertically (i.e., perpendicular to the electron beam and the axis of the coil). Using a calibrated microscope stage, the distance between phosphor dots may then be measured. This distance will correspond to the displacement along the x axis of the chart recorder. The gain of the x axis may then be adjusted to calibrate the x deflection to provide a maximum deflection of 12 to 15 inches, and to calibrate the x-axis in deflection distance per division.

The following steps are representative of a suitable calibration procedure for the x-y recorder.

1. Turn on the display to generate a stroke pattern of vertical and horizontal lines. (Note: only one coordinate axis is measured at a time, but this allows the use of a single scanning pattern).
2. Set the function generator to generate a triangle waveform to produce about 50–100 mil deflection at 0.2 Hz.
3. Measure the deflection of the pattern along the desired axis of misconvergence using a microscope with a calibrated carriage.
4. Set the graphic recorder to produce a full-scale deflection (say 12–15 inches for a chart recorder) with the triangle waveform applied, with the "up" direction of the beam displacement corresponding to the right edge of the chart.
5. Compute the x-axis recorder sensitivity by dividing the measured optical deflection by the corresponding distance traversed by the pen of the chart recorder.

An example computation illustrates this procedure. The data is referenced to FIG. 7, which shows a typical chart recording.

Figure 7:
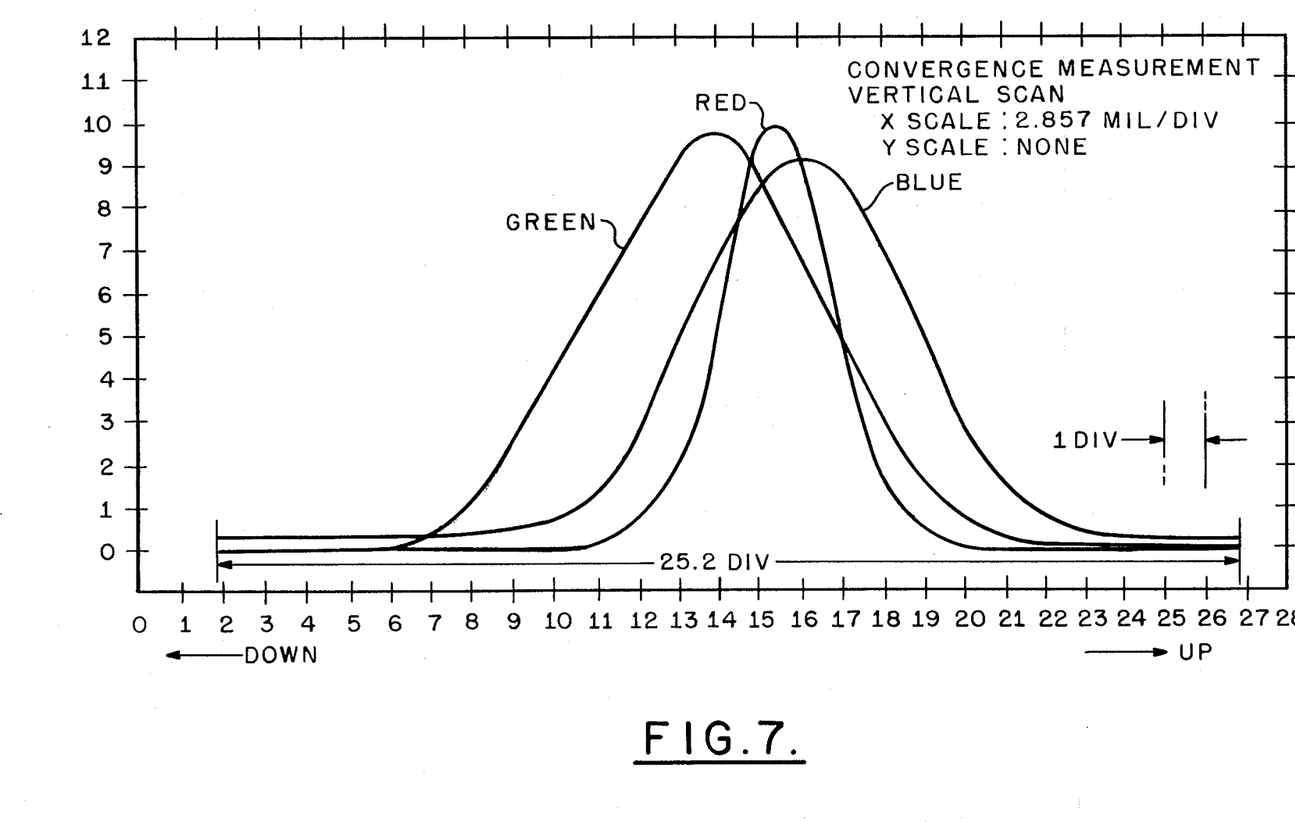
FIG. 7 shows the measured values of vertical convergence and linewidth for a typical display configuration.

1. With a horizontal stroke vector, the pattern was deflected vertically to measure vertical misconvergence. The optical deflection was 72.0 mils.
2. The recorder gain was adjusted for approximately 10 inch deflection. Using ruled chart paper, with three divisions per inch, the measured x-axis pen deflection was 25.2 divisions.
3. The x-axis scale factor was computed at 72/25.2=2.857 mils/div. Thus, the horizontal axis recorder calibration factor is 2.857 mils/div., which represents the sensitivity to a *beam* deflector in the vertical direction. The y axis of the chart recorder does not need to be calibrated in absolute terms to obtain convergence and linewidth data, although such calibration can be performed with a reference light source if peak brightness calibration is desired. Typically, the y-axis gain may be set to provide a maximum deflection of about 75 percent of the chart height.

The photometer sensing area is then focused on a phosphor dot, say red, as the horizontal sweep line is cyclically traversed across the phosphor dot in a vertical direction resulting in a plot of brightness versus deflection distance as shown in FIG. 4. From this recording, the linewidth can be computed.

Referring now to FIG. 1, the photometer sensor is then moved horizontally to an adjacent green dot and the vertical trace repeated. Finally, the photometer is moved horizontally to the blue dot adjacent to the red dot and the vertical tracing again performed. Thus, a single chart will have three brightness versus deflected distance plots corresponding to the three adjacent phosphor color dots. For a monochrome CRT, this step need be performed only once.

Using the procedure outlined above in one embodiment, the peaks of the red, green, and blue traces were found to be 10 divisions, 9.7 divisions, and 9.2 divisions high, respectively, as shown in FIG. 7. The correspnding one-half peak values are 5.0, 4.8 and 4.6 divisions, respectively. From the Figure, the trace widths are red: 3.0, green: 6.8; and blue: 6.5 divisions. These values are related to the actual linewidths by the calculated scale factors:

Red linewidth = 3.0 div. × 2.86 mils/div. = 8.7 mils
Green linewidth = 6.8 div. × 2.86 mils/div. = 19.7 mils
Blue linewidth = 6.5 div. × 2.86 mils/div. = 18.6 mils Referring to FIG. 3A, it may be seen that for perfect vertical convergence the red, green and blue brightness curves will be superimposed. In practice, there may be slight differences in maximum brightness levels for the different colors, due to the difference in luminescent efficiency. However, the perfectly converging system will have all brightness curves aligned on a common vertical axis. FIG. 3B shows the result of misconvergence wherein the green and blue brightness curves are displaced from the red curve at corresponding distances $M_{GV}$ and $M_{BV}$, whose values have previously been described.

Referring again to FIG. 7, it may be seen that the red and green peaks are separated by 1.5 divisions and the red and blue peaks are separated by 0.7 divisions. Applying the previously computed x-axis scale factor for the chart recorder, the misconvergence components may be computed, with values below the red peak considered negative, and values above the red peak considered positive.

$M_{GV} = -1.5$ div. × 2.86 mils/div. = $-4.3$ mils
$M_{BV} = 0.7$ div. × 2.86 mils/div. = 2.0 mils With the display face aligned as in FIG. 1, in order to measure the horizontal misconvergence component it is necessary to deflect a vertical stroke line horizontally past the stationary photometer. However, as was observed, positioning the photometer over the red, green and blue color dots cannot be done along the axis of the vertical stroke line because the color dots are not correspondingly aligned. Further, the apparatus of FIG. 6 does not permit deflecting the electron beams other than in the vertical direction. Therefore, it is convenient to rotate the display unit by 90° within the induction coil apparatus. The resulting phosphor dot pattern is shown in FIG. 2. The electron beams are now caused to display a horizontal stroke line which is deflected in a vertical direction by the external induction coils. A triad 16 of red, blue and green phosphor dots is show in the Figure. As noted heretofore, simultaneous positioning of the photometer over the red, green and blue phosphor dots cannot be done along the horizontal axis of the stroke line. Therefore, if the stroke line is adjusted to pass through the red dots, the photometer must be traversed vertically to sense the green and blue dots. After focusing the sensor on the center of the red dot of the triad and obtaining the brightness vs displacement characteristic, it is traversed horizontally and then vertically to focus on the green dot. This vertical distance is measured optically using the calibrated stage of the microscope to give the value $V_G$. The photometer is then focused on the blue dot to obtain the value $V_B$. The brightness measurement is repeated for each color dot. So long as the distance between the dots can be accurately measured with the microscope, the particular dots selected are not critical. For perfect horizontal convergence, the red, green and blue brightness peaks should be separated by a distance corresponding to $V_G$ and $V_B$ as shown in FIG. 3C. Referring to FIG. 3D, it may be seen that the misconvergence values, $M_{BH}$ and $M_{GH}$, may be obtained by subtracting from $X_B$ and $X_G$ the respective predetermined vertical convergence factors $V_B$ and $V_G$.

It may be seen that the foregoing apparatus facilitates a convenient method for measuring convergence in a color cathode ray tube display system. The display system is energized to scan in a stroke pattern along a preferred axis, which may be vertical or horizontal for convenience, on the viewing face of the tube. The displayed line is scanned past a stationary photoresponsive detector focused on the viewing face. Simultaneously, an independent magnetic deflection field is applied to the display system which causes the deflection of electron beams used to illuminate independent regions of color along the scanned line. The effect of the magnetic deflection field is to displace the illuminated pattern in a direction orthogonal to the stroke axis in the plane of the viewing face. The brightness of the signal is then observed as the electron beam is deflected across the viewing field of the detector. The output signal thus developed is applied to one axis of a recorder and provides an amplitude representative of the convergence characteristic of a color phosphor region on which the detector is focused. An orthogonal axis of the recorder is actuated by a signal corresponding to the magnetic deflection field. The convergence may then be calculated by taking the difference between the displacement values so obtained from observations of a plurality of such regions.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for measuring convergence in a cathode ray tube display system of the type including a generally planar viewing surface, comprised of a plurality of closely spaced adjacent independent regions of phosphorescent material at predetermined horizontal and vertical displacements, said tube having a plurality of independently driven electron beams adapted to be controlled by beam deflection signals so as to converge on a first plurality of said regions along a first axis whereby said regions are sequentially illuminated, comprising:

magnetic deflection means, positioned on said display system and coupled to said electron beams, independent of said beam deflection signals, for producing a magnetic field inductively cooperating with said electron beams so as to provide a deflection of said electron beams along a second axis coplanar with said viewing surface whereby said beams are caused to traverse said regions along said second axis;

function generator means coupled to provide a cyclical control signal for energizing said magnetic deflection means;

photo-responsive detector means for sensing luminescent radiation from said viewing surface and adapted for focusing on an essentially centrally disposed area of one of said regions along said first axis, traverse means for carrying said photo-responsive detector means and displacing said means by at least one of said predetermined horizontal and vertical displacements to focus on an area of a further one of said regions along at least one of said first and second axes and display means, coupled to respond to said cyclical function generator means and said photo-responsive detector means, for providing an output signal indicative of relative brightness of said one region and said further one of said regions as a function of beam deflection.

2. The apparatus as set forth in claim 1 wherein said magnetic deflection means comprises a plurality of planar electrically inductive coils having a geometric axis normal to the plane thereof defining the direction of a magnetic field, said coils disposed to influence said electron beams for deflection along said second axis coplanar with said viewing surface and orthogonal to said beams and said magnetic field direction.

3. The apparatus as set forth in claim 2, wherein said magnetic deflection means comprises a U-shaped housing having a base and first and second parallel ends extending therefrom, said housing defining an aperture for receiving said display system, said plurality of electrically inductive coils comprising at least two solenoidal coils disposed respectively on said first and second ends, with said geometric axis extending through said coils parallel to said viewing suface.

4. The apparatus as set forth in claim 2, wherein said magnetic deflection means further comprises at least one pair of parallel electrically inductive coils, said pair polarized for urging deflection of said beams along said second axis when energized by said function generator means.

5. The apparatus as set forth in claim 4, further comprising a second pair of parallel electrically inductive coils, said pair disposed orthogonally with respect to said first pair, for urging deflection of said beams in a direction orthogonal to said second axis when independently energized by said function generator means.

6. The apparatus as set forth in claim 5, further comprising switch means for selectively energizing one of said first and second coil pairs.

7. A method for measuring convergence in a cathode ray tube display system comprising the steps of:

identifying an accurately positioned location on a viewing surface of said display, positioning a photo-responsive detector for sensing one of a plurality of independent phosphorescent regions on said viewing surface, energizing an electron beam in said display system adapted to scan across at least a first essentially horizontal axis on an area of said viewing face to serially illuminate a predetermined pattern of said regions, applying an independent magnetic deflection field, exposing said display system to said independent magnetic deflection field superimposed thereupon, applying a cyclical control signal for urging displacement of said electron beam by said magnetic deflection field along a second essentially vertical axis coplanar with said viewing surface, sensing said displacement by observing said pattern through said photo-responsive detector while said magnetic deflection field is alternately excited by said control signal in opposing directions with respect to said first axis, and energizing a display means with a signal from said detector representative of the brightness of one of said plurality of regions as a function of beam deflection, and also responsive to said cyclical control signal.

8. The method of claim 7 wherein said display system includes a three beam color cathode ray tube and said plurality of regions includes red, green, and blue phosphors, in which said detector is positioned to view ones of said red, green and blue phosphor regions.

9. The method of claim 8, wherein said regions are comprised of phosphorescent dots.

10. The method of claim 8, wherein said regions are comprised of phosphorescent stripes disposed in a parallel array.

11. The apparatus of claim 1, wherein said regions are comprised of phosphorescent dots.

12. The apparatus of claim 1, wherein said regions are comprised of phosphorescent stripes disposed in a parallel array.

* * * * *